United States Patent
Achten et al.

(10) Patent No.: US 10,449,714 B2
(45) Date of Patent: Oct. 22, 2019

(54) PROCESS FOR PRODUCING AN OBJECT FROM A PRECURSOR AND USE OF A FREE-RADICALLY CROSSLINKABLE RESIN IN AN ADDITIVE MANUFACTURING PROCESS

(71) Applicant: Covestro Deutschland AG, Leverkusen (DE)

(72) Inventors: Dirk Achten, Leverkusen (DE); Thomas Büsgen, Köln (DE); Jörg Tillack, Solingen (DE); Michael Ludewig, Odenthal (DE); Christoph Tomczyk, Leverkusen (DE); Roland Wagner, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/812,116

(22) Filed: Nov. 14, 2017

(65) Prior Publication Data

US 2018/0133953 A1    May 17, 2018

(30) Foreign Application Priority Data

Nov. 14, 2016 (EP) .................................... 16198688

(51) Int. Cl.
| | | |
|---|---|---|
| C08G 18/02 | (2006.01) | |
| B29C 64/124 | (2017.01) | |
| B33Y 10/00 | (2015.01) | |
| B33Y 70/00 | (2015.01) | |
| C08G 18/10 | (2006.01) | |
| C08G 18/67 | (2006.01) | |
| C08G 18/81 | (2006.01) | |
| C08G 18/62 | (2006.01) | |
| C08G 18/72 | (2006.01) | |
| C08G 18/73 | (2006.01) | |
| C08G 18/79 | (2006.01) | |
| C08G 18/04 | (2006.01) | |
| C08G 18/22 | (2006.01) | |
| B29K 75/00 | (2006.01) | |

(52) U.S. Cl.
CPC ............ *B29C 64/124* (2017.08); *B33Y 10/00* (2014.12); *B33Y 70/00* (2014.12); *C08G 18/022* (2013.01); *C08G 18/04* (2013.01); *C08G 18/10* (2013.01); *C08G 18/225* (2013.01); *C08G 18/6229* (2013.01); *C08G 18/672* (2013.01); *C08G 18/6755* (2013.01); *C08G 18/728* (2013.01); *C08G 18/73* (2013.01); *C08G 18/792* (2013.01); *C08G 18/8175* (2013.01); *B29K 2075/00* (2013.01)

(58) Field of Classification Search
None
See application file for complete search history.

(56) References Cited

U.S. PATENT DOCUMENTS

| | | | |
|---|---|---|---|
| 3,211,703 | A | 10/1965 | Gilman et al. |
| 3,330,828 | A | 7/1967 | Grogler et al. |
| 4,128,537 | A | 12/1978 | Markiewitz |
| 4,145,544 | A | 3/1979 | Kuehn |
| 4,159,376 | A | 6/1979 | Kuehn |
| 4,265,798 | A | 5/1981 | Mishra |
| 4,379,905 | A | 4/1983 | Stemmler et al. |
| 4,487,928 | A | 12/1984 | Richter et al. |
| 4,604,418 | A | 8/1986 | Shindo et al. |
| 4,663,377 | A | 5/1987 | Hombach et al. |
| 4,870,152 | A | 9/1989 | Meixner et al. |

(Continued)

FOREIGN PATENT DOCUMENTS

| | | |
|---|---|---|
| DE | 3240613 A1 | 5/1984 |
| EP | 0100129 A1 | 2/1984 |

(Continued)

OTHER PUBLICATIONS

Cinnamon et al., Adhesion Properties of Poly(Hexamethylene Diisocyanate) Obtained by Organotin Catalysis, European Polymer Journal, vol. 16, pp. 147-148.

*Primary Examiner* — Monica A Huson
*Assistant Examiner* — Kelsey C Grace
(74) *Attorney, Agent, or Firm* — Drinker Biddle & Reath LLP

(57) ABSTRACT

A process for producing an object from a precursor comprises the steps of: depositing a free-radically crosslinked resin atop a carrier to obtain a ply of a construction material joined to the carrier which corresponds to a first selected cross section of the precursor; depositing a free-radically crosslinked resin atop a previously applied ply of the construction material to obtain a further ply of the construction material which corresponds to a further selected cross section of the precursor and which is joined to the previously applied ply; repeating step II) until the precursor is formed; wherein the depositing of a free-radically crosslinked resin at least in step II) is effected by exposure and/or irradiation of a selected region of a free-radically crosslinkable resin corresponding to the respectively selected cross section of the object and wherein the free-radically crosslinkable resin has a viscosity (23° C., DIN EN ISO 2884-1) of $\geq 5$ mPas to $\leq 100000$ mPas. In the process the free-radically crosslinkable resin comprises a curable component in which NCO groups and olefinic C=C double bonds are present, wherein in the curable component the molar ratio of NCO groups to olefinic C=C double bonds is in a range from $\geq 1:5$ to $\leq 5:1$.

12 Claims, No Drawings

(56) References Cited

U.S. PATENT DOCUMENTS

| | | | |
|---|---|---|---|
| 5,252,696 | A | 10/1993 | Laas et al. |
| 6,133,397 | A | 10/2000 | O'Connor et al. |
| 6,335,381 | B1 | 1/2002 | Hovestadt et al. |
| 6,500,876 | B2 | 12/2002 | Weikard et al. |
| 9,157,007 | B2 | 10/2015 | Xu et al. |
| 2001/0038917 | A1 | 11/2001 | Wiekard et al. |
| 2006/0051591 | A1* | 3/2006 | Weikard ............ C08G 18/8175 428/423.1 |
| 2008/0145624 | A1 | 6/2008 | Weikard et al. |
| 2011/0089610 | A1* | 4/2011 | El-Siblani ............... B29C 33/44 264/401 |
| 2014/0017460 | A1 | 1/2014 | Xu et al. |
| 2015/0158966 | A1 | 6/2015 | Laas et al. |

FOREIGN PATENT DOCUMENTS

| | | | |
|---|---|---|---|
| EP | 0347610 | A2 | 12/1989 |
| GB | 809809 | A | 3/1959 |
| GB | 952931 | A | 3/1964 |
| GB | 966338 | A | 8/1964 |
| GB | 1386399 | A | 3/1975 |
| GB | 1391066 | A | 4/1975 |
| GB | 2221465 | A | 2/1990 |
| GB | 2222161 | A | 2/1990 |

\* cited by examiner

PROCESS FOR PRODUCING AN OBJECT FROM A PRECURSOR AND USE OF A FREE-RADICALLY CROSSLINKABLE RESIN IN AN ADDITIVE MANUFACTURING PROCESS

CROSS REFERENCE TO RELATED APPLICATIONS

This application is a Paris Convention filing of EP 16198688.0 application, filed Nov. 14, 2016, the entirety of which is incorporated by reference herein.

FIELD OF THE INVENTION

The present invention relates to a process for producing an object from a precursor, comprising the steps of:
I) depositing a free-radically crosslinked resin atop a carrier to obtain a ply of a construction material joined to the carrier which corresponds to a first selected cross section of the precursor;
II) depositing a free-radically crosslinked resin atop a previously applied ply of the construction material to obtain a further ply of the construction material which corresponds to a further selected cross section of the precursor and which is joined to the previously applied ply;
III) repeating step II) until the precursor is formed;
wherein the depositing of a free-radically crosslinked resin at least in step II) is effected by exposure and/or irradiation of a selected region of a free-radically crosslinkable resin corresponding to the respectively selected cross section of the precursor, and wherein the free-radically crosslinkable resin has a viscosity (23° C., DIN EN ISO 2884-1) of ≥5 mPas to ≤100000 mPas.

The invention further relates to the use of a free-radically crosslinkable resin having a viscosity (at 23° C. measured with a Wells/Brookfield cone-plate viscometer according to DIN EN ISO 2884-1) of ≥5 mPas to ≤100000 mPas in an additive manufacturing process, wherein the resin comprises a curable compound having isocyanurate groups, NCO groups and olefinic C═C double bonds. The invention finally relates to a polymer obtainable by crosslinking such a resin.

BACKGROUND OF THE INVENTION

Polymers having a polyisocyanurate structure are known for their high thermal stability and flame resistance. Polyisocyanurate-containing foams (PUR/PIR-foams) based on aromatic 4,4'-diphenylmethane diisocyanate (MDI) and polyether polyols and polyepoxides are widely used on account of their very low thermal conductivity for example, in particular as high-performance insulating materials.

Polyisocyanurates also find practical application as crosslinking agents in paint chemistry, the production of which involves stopping the trimerization reaction at low conversions and removing excess unreacted monomeric diisocyanate. Thus, in the production of crosslinking agents based on isocyanurates proceeding from aliphatic and mixed aliphatic and aromatic monomeric diisocyanates, DE 31 00 263; GB 952 931, GB 966 338; U.S. Pat. No. 3,211,703 or 3,330,828 envisage performing the reaction either in dilute conditions or only up to low conversion values with very precise temperature control. Crosslinked polyisocyanurate plastics materials are specifically not formed, only oligomeric, low-viscosity, soluble products. U.S. Pat. No. 6,133,397 discloses a coating composition having a low content of volatile organic compounds and a viscosity (ZAHN-cup 2) of less than about 200 seconds. The composition consists essentially of at least one aliphatic polyisocyanate, a solvent in an amount between 0% and 45% based on the weight of the polyisocyanate in the composition, and a trimerization catalyst. The composition is essentially free from volatile mono- and diisocyanates.

Isocyanurates constructed based on isocyanates having an NCO functionality of more than two retain free NCO groups which may be further functionalized by subsequent reactions.

EP 0 000 658 A1 discloses a process for producing an ethylenically unsaturated isocyanurate in which a polyisocyanate is reacted with a hydroxyl component containing a monohydric alcohol, wherein said isocyanurate contains a vinylidene group but no allyl group, wherein the reaction is performed in the presence of a copper salt to obtain an isocyanate-containing urethane, wherein the amounts of the hydroxyl component and the polyisocyanate are chosen such that after said reaction 0.75 to 1.6 mol of unconverted isocyanate groups per mole of polyisocyanate used are retained. Subsequently, a catalytic amount of an isocyanate trimerization catalyst which initiates trimerization of the isocyanate-containing urethane without causing gelation is added so that the isocyanate-containing urethane is timerized to produce an ethylenically unsaturated isocyanurate. In one embodiment the monohydric alcohol may be hydroxypropyl methacrylate, hydroxypropyl acrylate, hydroxyethyl methacrylate, hydroxyethyl acrylate, pentaerythritol triacrylate, pentaerythritol trimethacrylate, or a mixture thereof.

EP 0 315 020 A2 relates to a process for producing compounds comprising isocyanurate groups and olefinic double bonds by reaction of a) a polyisocyanate component comprising isocyanurate groups and containing polyisocyanates with b) an olefinically unsaturated alcohol component consisting of at least one hydroxyalkyl ester of acrylic acid or methacrylic acid, characterized in that one uses a) as the polyisocyanate component (i) N,N',N"-tris(isocyanatohexyl) isocyanurate present optionally in admixture with its higher homologues comprising more than one isocyanurate ring or (ii) mixtures of the polyisocyanates recited under (i) with up to 40 NCO equivalent % based on the entirety of component a) of other polyisocyanates with aliphatically and/or cycloaliphatically bonded isocyanate groups, and the reaction is performed with co-use of c) a polyol component consisting essentially of a polyester polyol having an OH number of 80 to 350 based on (i) acid component consisting to an extent of at least 80 carboxyl equivalent % of adipic acid and/or isophthalic acid and (ii) a polyol component consisting at least to an extent of 70 hydroxyl equivalent % of 1,6-hexanediol, wherein the amount of component c) makes up 20 to 150 wt % based on the weight of component b) and the reaction is performed while maintaining an NCO/OH equivalent ratio of 0.9:1 to 1.1:1, wherein the alcoholic components b) and c) are reacted with the polyisocyanate component in any desired sequence or in admixture. In one embodiment 2-hydroxyethyl acrylate, 2-hydroxyethyl methacrylate, 2-hydroxypropyl acrylate, 2-hydroxypropyl methacrylate or any desired mixtures of these compounds are used as component b).

EP 0 347 610 A2 describes UV-curable mixtures containing A) 15-60 wt % based on the total of 100 wt % of A)+B)+C) of reaction products of hydroxyalkyl acrylates with aliphatic polyisocyanates containing at least 2 isocyanate groups and at least one uretdione and/or triisocyanurate and/or biuret group per molecule; B) 30-84 wt % based on the total of 100 wt % of A)+B)+C) of di- or trifunctional (meth)acrylates having a molecular weight below 500; C) 1-10 wt % based on the total of 100 wt % of A)+B)+C) of compounds having one polymerizable group per molecule and a molecular weight below 200, and D) photoinitiators in customary amounts based on the total of 100 wt % of A)+B)+C). In the mixtures component A) may represent reaction products of hydroxyethyl acrylate with the uretdione and/or triisocyanurate and/or biuret based on hexamethylene diisocyanate.

U.S. Pat. No. 4,145,544 discloses a process for producing an ethylenically unsaturated isocyanurate comprising the steps of (1) trimerization of an aromatic polyisocyanate to form an NCO-containing isocyanurate, wherein the trimerization is performed in the presence of an isocyanate trimerization catalyst and a solvent; and (2) reaction of the NCO groups present in the NCO-containing isocyanurate with the hydroxyl group of a monohydric alcohol containing a vinylidene group in the presence of a solvent to form an ethylenically unsaturated isocyanurate. The solvent employed in steps (1) and (2) is a vinylidene solvent which is free from groups that react with isocyanate groups and which contains at least 20 weight % of an ethylenically unsaturated polar solvent. In one embodiment the monohydric alcohol is hydroxypropyl methacrylate, hydroxypropyl acrylate, hydroxyethyl methacrylate, hydroxyethyl acrylate or mixtures thereof.

U.S. Pat. No. 4,159,376 relates to a process for producing an ethylenically unsaturated isocyanurate, comprising a first step of reacting an aromatic polyisocyanate with a monohydric alcohol containing a vinylidene group selected from hydroxypropyl methacrylate, hydroxypropyl acrylate, hydroxyethyl methacrylate, hydroxyethyl acrylate or mixtures thereof to form a monoisocyanate-containing urethane, and comprising a second step of reacting the monoisocyanate-containing urethane with tris(2-hydroxyethyl)isocyanurate to obtain an ethylenically unsaturated isocyanurate.

SUMMARY OF THE INVENTION

The present invention at least partly overcomes at least one disadvantage of the prior art. The invention provides an additive manufacturing process where the produced objects can exhibit a high resolution coupled with a high strength. Finally, the invention enables the production of such objects in a manner which is as cost-efficient and/or individualized and/or resource-sparing as possible.

This is achieved in accordance with the invention by a process according to claim 1 and a use according to claim 12. Advantageous developments are specified in the subsidiary claims. They may be combined as desired unless the opposite is clear from the context.

A process for producing an object from a precursor comprises the steps of:

I) depositing a free-radically crosslinked resin atop a carrier to obtain a ply of a construction material joined to the carrier which corresponds to a first selected cross section of the precursor;

II) depositing a free-radically crosslinked resin atop a previously applied ply of the construction material to obtain a further ply of the construction material which corresponds to a further selected cross section of the precursor and which is joined to the previously applied ply;

III) repeating step II) until the precursor is formed;

wherein the depositing of a free-radically crosslinked resin at least in step II) is effected by exposure and/or irradiation of a selected region of a free-radically crosslinkable resin corresponding to the respectively selected cross section of the precursor, and wherein the free-radically crosslinkable resin has a viscosity (23° C., DIN EN ISO 2884-1) of ≥5 mPas to ≤100000 mPas.

In the process the free-radically crosslinkable resin comprises a curable component in which NCO groups and olefinic C=C double bonds are present, wherein in the curable component the molar ratio of NCO groups to olefinic C=C double bonds is in a range from ≥1:5 to ≤5:1.

In the process, after step III) step IV) is further performed:

IV) treating the precursor obtained after step III) under conditions sufficient to at least partially trimerize to isocyanurate groups NCO groups present in the free-radically crosslinked resin of the obtained precursor to obtain the object.

In the process according to the invention the object is thus obtained in two production phases. The first production phase may be regarded as a construction phase. This construction phase may be realized by means of ray-optic additive manufacturing processes such as the inkjet method, stereolithography or the DLP (digital light processing) method and is represented by steps I), II) and III). The second production phase may be regarded as a curing phase and is represented by step IV). Here, the precursor or intermediate object obtained after the construction phase is converted into a more mechanically durable object, without further changing the shape thereof. In the context of the present invention the material from which the precursor is obtained in the additive manufacturing process is referred to generally as "construction material".

Step I) of the process comprises depositing a free-radically crosslinked resin atop a carrier. This is usually the first step in inkjet, stereolithography and DLP methods. In this way a ply of a construction material joined to the carrier which corresponds to a first selected cross section of the precursor is obtained.

As per the instruction of step III), step II) is repeated until the desired precursor has been formed. Step II) comprises depositing a free-radically crosslinked resin atop a previously applied ply of the construction material to obtain a further ply of the construction material which corresponds to a further selected cross section of the precursor and which is joined to the previously applied ply. The previously applied ply of the construction material may be the first ply from step I) or a ply from a previous run of step II).

It is provided in accordance with the invention that the depositing of a free-radically crosslinked resin at least in step II) (preferably also in step I) is effected by exposure and/or irradiation of a selected region of a free-radically crosslinkable resin corresponding to the respectively selected cross section of the object. This may be achieved either by selective exposure (stereolithography, DLP) of the resin or by selective application of the resin followed by an exposure step which, on account of the preceding selective application of the resin, need no longer be selective (inkjet method).

In the context of the present invention the terms "free-radically crosslinkable resin" and "free-radically crosslinked resin" are used. The free-radically crosslinkable resin is converted here into the free-radically crosslinked resin by the exposure and/or irradiation which triggers free-radical crosslinking reactions. "Exposure" is to be understood in the present context as meaning the action of light in the range between near-IR and near-UV light (wavelengths of 1400 nm to 315 nm). The remaining shorter wavelength ranges are covered by the term "irradiation", for example far UV light, x-ray radiation, gamma radiation and also electron radiation.

The selecting of the respective cross section is advantageously effected by means of a CAD program, with which a model of the object to be produced has been generated. This operation is also known as "slicing" and serves as a basis for controlling the exposure and/or irradiation of the free-radically crosslinkable resin.

The free-radically crosslinkable resin has a viscosity (23° C., DIN EN ISO 2884-1) of ≥5 mPas to ≤100000 mPas. It may accordingly be regarded as a liquid resin at least for the purposes of additive manufacture. The viscosity is preferably ≥50 mPas to ≤10000 mPas, more preferably ≥500 mPas to ≤1000 mPas.

In the process the free-radically crosslinkable resin further comprises a curable component in which NCO groups and olefinic C=C double bonds are present, wherein in the curable component the molar ratio of NCO groups to olefinic C=C double bonds is in a range from ≥1:5 to ≤5:1 (preferably ≥1:4 to ≤4:1, more preferably ≥1:3 to ≤3:1). The molecular ratio of these functional groups may be determined by integration of the signals of a sample in the $^{13}C$-NMR spectrum.

In addition to the curable component the free-radically crosslinkable resin may also comprise a non-curable component in which for example stabilizers, fillers and the like are encompassed. In the curable component the NCO groups and the olefinic C=C double bonds may be present in separate molecules and/or in a common molecule. When NCO groups and olefinic C=C double bonds are present in separate molecules the body obtained after step IV) of the process according to the invention exhibits an interpenetrating polymer network.

In the process, after step III) step IV) is further performed. This step comprises treating the precursor obtained after step III) under conditions sufficient to at least partially trimerize to isocyanurate groups NCO groups present in the free-radically crosslinked resin of the obtained precursor to obtain the object.

The treating in step IV) may in the simplest case be a storage at room temperature (20° C.). Storage at a temperature above room temperature is also possible. During step IV) the NCO groups react with one another to effect further crosslinking of the previously free-radically crosslinked material. This reaction results at least partially in trimerization to afford isocyanurate groups. The present invention also comprehends the possibility that uretdione, allophanate, urea, urethane, biuret, iminooxadiazinedione and/or oxadiazinetrione groups can also be formed from the NCO groups. Such side reactions may be specifically employed, for example to influence the glass transition temperature $T_g$ of the obtained material.

It is preferable when the reaction is performed until ≤20%, preferably ≤10% and more preferably ≤5% of the isocyanate groups present in the curable component are still present. This may be determined by quantitative IR spectroscopy. It is further preferable when in step IV) ≥50%, ≥60%, ≥70% or ≥80% of the isocyanate groups originally present in the curable component are converted into isocyanurate groups.

It is preferable when step IV) is performed only when the entirety of the construction material of the precursor has reached its gel point. The gel point is regarded as reached when in a dynamic mechanical analysis (DMA) with a plate/plate oscillation viscometer in accordance with ISO 6721-10 at 20° C. the graphs of the storage modulus G' and the loss modulus G" intersect. The precursor is optionally subjected to further exposure and/or radiation to complete free-radical crosslinking. The free-radically crosslinked resin can exhibit a storage modulus G' (DMA, plate/plate oscillation viscometer according to ISO 6721-10 at 20° C. and a shear rate of 1/s) of ≥$10^6$ Pa.

The free-radically crosslinkable resin may further contain additives such as fillers, UV-stabilizers, free-radical inhibitors, antioxidants, mold release agents, water scavengers, slip additives, defoamers, flow agents, rheology additives, flame retardants and/or pigments. These auxiliaries and additives, excluding fillers and flame retardants, are typically present in an amount of less than 10 wt %, preferably less than 5 wt %, particularly preferably up to 3 wt %, based on the free-radically crosslinkable resin. Flame retardants are typically present in amounts of not more than 70 wt %, preferably not more than 50 wt %, particularly preferably not more than 30 wt %, calculated as the total amount of employed flame retardants based on the total weight of the free-radically crosslinkable resin.

Suitable fillers are for example $AlOH_3$, $CaCO_3$, metal pigments such as $TiO_2$ and further known customary fillers. These fillers are preferably employed in amounts of not more than 70 wt %, preferably not more than 50 wt %, particularly preferably not more than 30 wt %, calculated as the total amount of employed fillers based on the total weight of the free-radically crosslinkable resin.

Suitable UV stabilizers may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred light stabilizers may be employed either individually or in any desired combinations with one another.

Particularly preferred UV stabilizers are those which completely absorb radiation having a wavelength <400 nm. These include the recited benzotriazole derivatives for example. Very particularly preferred UV stabilizers are 2-(5-chloro-2H-benzotriazol-2-yl)-6-(1,1-dimethylethyl)-4- methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

One or more of the UV stabilizers recited by way of example are optionally added to the free-radically crosslinkable resin preferably in amounts of 0.001 to 3.0 wt %, particularly preferably 0.005 to 2 wt %, calculated as the total amount of employed UV stabilizers based on the total weight of the free-radically crosslinkable resin.

Suitable antioxidants are preferably sterically hindered phenols which may be selected preferably from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. These may be used either individually or in any desired combinations with one another as required. These antioxidants are preferably employed in amounts of 0.01 to 3.0 wt %, particularly preferably 0.02 to 2.0 wt %, calculated as the total amount of employed antioxidants based on the total weight of the free-radically crosslinkable resin.

Suitable free-radical inhibitors/retarders are preferably those which specifically inhibit uncontrolled free-radical polymerization of the resin formulation outside the desired (irradiated) region. These are crucial for good contour sharpness and imaging accuracy in the precursor. Suitable free-radical inhibitors must be chosen according to the desired free-radical yield from the irradiation/exposure step and the polymerization rate and reactivity/selectivity of the double bond carrier. Suitable free-radical inhibitors are for example 2,2-(2,5-thiophendiyl)bis(5-tertbutylbenzoxazole), phenothiazine, hydroquinone, hydroquinone ether, quinone alkydes and nitroxyl compounds and mixtures thereof, benzoquinones, copper salts, catechols, cresols, nitrobenzene and oxygen. These antioxidants are preferably employed in amounts of 0.001 wt % to 3 wt %.

Embodiments and further aspects of the present invention are elucidated hereinbelow. They may be combined with one another as desired unless the opposite is clear from the context.

In a preferred embodiment isocyanurate groups are further present in the curable component; in the curable component the molar ratio of NCO groups to isocyanurate groups is in a range from ≤100:1 to ≥1:2 (preferably ≤70:1 to ≥1:1, more preferably ≤50:1 to ≥2:1) and in the curable component the molar ratio of olefinic C=C double bonds to isocyanurate groups is in a range from ≤100:1 to ≥1:5 (preferably ≤70:1 to ≥1:3, more preferably ≤50:1 bis ≥1:2). The isocyanurate groups are preferably part of a polyisocyanurate. The molar ratio of NCO groups or C=C double bonds to isocyanurate groups may be determined by integration of the corresponding signals in the $^{13}$C-NMR spectrum of the sample.

In a further preferred embodiment the curable component comprises a curable compound which comprises NCO groups and olefinic C=C double bonds, wherein in the curable compound the molar ratio of NCO groups to olefinic C=C double bonds is in a range from ≥1:5 to ≤5:1 (preferably ≥1:4 to ≤4:1, more preferably ≥1:3 to ≤3:1). This compound thus contains the two recited groups in one molecule.

In a further preferred embodiment the curable component comprises a curable compound which comprises isocyanurate groups, NCO groups and olefinic C=C double bonds, wherein
in the curable compound the molar ratio of NCO groups to olefinic C=C double bonds is in a range from ≥1:5 to ≤5:1 (preferably ≥1:4 to ≤4:1, more preferably ≥1:3 to ≤3:1),
in the curable compound the molar ratio of NCO groups to isocyanurate groups is in a range from ≤100:1 to ≥1:2 (preferably ≤70:1 to ≥1:1, more preferably ≤50:1 to ≥2:1) and
in the curable compound the molar ratio of olefinic C=C double bonds to isocyanurate groups is in a range from ≤100:1 to ≥1:5 (preferably ≤70:1 to ≥1:3, more preferably ≤50:1 to ≥1:2).

This compound thus contains the three recited groups in one molecule. Also included are polymers with the molecular weight distribution of said compound which comprise these groups in each molecule of the polymer.

To increase the NCO group content in the curable component further NCO-functional compounds such as polyisocyanates and NCO-terminated prepolymers may be added. In this way the mechanical properties of the obtained object may be adapted further.

To increase the double bond content in the curable component further double-bond-functional compounds having 1 to 6 C=C double bonds may also be added. In this way the mechanical properties of the obtained object and the viscosity of the crosslinkable resin may be adapted further.

In a further preferred embodiment the olefinic double bonds are present in the curable compound at least partially in the form of (meth)acrylate groups.

In a further preferred embodiment the curable compound is obtainable from the reaction of an NCO-terminated polyisocyanate prepolymer with a molar deficiency, based on the free NCO groups, of a hydroxyalkyl (meth)acrylate.

In a further preferred embodiment the curable compound is obtainable from the reaction of an NCO-terminated polyisocyanurate with a molar deficiency, based on the free NCO groups, of a hydroxyalkyl (meth)acrylate.

Suitable polyisocyanates for producing the NCO-terminated polyisocyanurates are for example those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H$_{12}$MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis (isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates.

It is further possible in accordance with the invention to also employ aliphatic and/or aromatic isocyanate end group-bearing prepolymers, for example aliphatic or aromatic isocyanate end group-bearing polyether, polyester, polyacrylate, polyepoxide or polycarbonate prepolymers as reactants for the isocyanurate formation. Suitable trimerization catalysts are described hereinbelow in connection with another embodiment.

Suitable hydroxyalkyl (meth)acrylates are inter alia alkoxyalkyl (meth)acrylates having 2 to 12 carbon atoms in the hydroxyalkyl radical. Preference is given to 2-hydroxyethyl acrylate, the isomer mixture formed during addition of propylene oxide onto acrylic acid, or 4-hydroxybutyl acrylate.

The reaction between the hydroxyalkyl (meth)acrylate and the NCO-terminated polyisocyanurate may be catalyzed by the customary urethanization catalysts such as DBTL. In this reaction the molar ratio of NCO groups to OH groups of the hydroxyalkyl (meth)acrylate may be in a range from ≥10:1 to ≤1.1:1 (preferably ≥5:1 to ≤1.5:1, more preferably ≥4:1 to ≤2:1). The obtained curable compound may have a number-average molecular weight $M_n$ of ≥200 g/mol to ≤5000 g/mol. This molecular weight is preferably ≥300 g/mol to ≤4000 g/mol, more preferably ≥400 g/mol to ≤3000 g/mol.

Particular preference is given to a curable compound obtained from the reaction of an NCO-terminated polyisocyanurate with hydroxyethyl (meth)acrylate, wherein the NCO-terminated polyisocyanurate was obtained from 1,6-hexamethylene diisocyanate in the presence of an isocyanate trimerization catalyst. This curable compound has a number-average molecular weight $M_n$ of ≥400 g/mol to ≤3000 g/mol and a molar ratio of NCO groups and olefinic C=C double bonds in a range from ≥1:5 to ≤5:1, particularly preferably ≥1:3 to ≤3:1, very particularly preferably ≥1:2 to ≤2:1.

In a further preferred embodiment the free-radically crosslinkable resin further comprises a free-radical starter and/or an isocyanate trimerization catalyst. To prevent an undesired increase in the viscosity of the free-radically crosslinkable resin, free-radical starters and/or isocyanate trimerization catalyst may be added to the resin only immediately before commencement of the process according to the invention.

Contemplated free-radical starters include thermal and/or photochemical free-radical starters (photoinitiators). It is also possible for thermal and photochemical free-radical starters to be employed simultaneously. Suitable thermal free-radical starters are for example azobisisobutyronitrile (AIBN), dibenzoylperoxide (DBPO), di-tert-butyl peroxide and/or inorganic peroxides such as peroxodisulfates.

Photoinitiators are in principle distinguished into two types, the unimolecular type (I) and the bimolecular type (II). Suitable type (I) systems are aromatic ketone compounds, for example benzophenones in combination with tertiary amines, alkylbenzophenones, 4,4'-bis(dimethylamino)benzophenone (Michler's ketone), anthrone and halogenated benzophenones or mixtures of the recited types. Also suitable are type (II) initiators such as benzoin and derivatives thereof, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones. Specific examples are Irgacur500 (a mixture of benzophenone and (1-hydroxycyclohexyl) phenylketone, from Ciba, Lampertheim, DE), Irgacure819 DW (phenylbis-(2, 4, 6-trimethylbenzoyl)phosphine oxide, from Ciba, Lampertheim, DE) or Esacure KIP EM (oligo-[2-hydroxy-2-methyl-1-[4-(1-methylvinyl)-phenyl]-propanones], from Lamberti, Aldizzate, Italy) and bis(4-methoxybenzoyl)diethylgermanium. Mixtures of these compounds may also be employed.

It should be ensured that the photoinitiators have a sufficient reactivity toward the radiation source used. A plurality of photoinitiators are known on the market. Commercially available photoinitiators cover the wavelength range of the entire UV-VIS spectrum. Photoinitiators find use in the production of paints, printing inks and adhesives and also in the dental sector.

In the process according to the invention the photoinitiator is generally employed in a concentration based on the amount of employed curable olefinically unsaturated double bond-bearing component of 0.01 to 6.0 wt %, preferably of 0.05 to 4.0 wt % and particularly preferably of 0.1 to 3.0% wt %.

Suitable isocyanate trimerization catalysts are in principle all compounds which accelerate the addition of isocyanate groups to afford isocyanurate groups and thus crosslink the isocyanate-containing molecules present.

Suitable isocyanate trimerization catalysts are for example simple tertiary amines, for example triethylamine, tributylamine, N,N-dimethylaniline, N-ethylpiperidine or N,N'-dimethylpiperazine. Suitable catalysts also include the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems known from GB 2 222 161 that consist of mixtures of tertiary bicyclic amines, for example DBU, with simple low-molecular-weight aliphatic alcohols.

Likewise suitable as isocyanate trimerization catalysts are a plurality of different metal compounds. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are known from DE-A 3 219 608, for example of propionic acid, butyric acid, valeric acid, caproic acid, heptanoic acid, caprylic acid, pelargonic acid, capric acid and undecylenoic acid, the alkali metal or alkaline earth metal salts of aliphatic, cycloaliphatic or aromatic mono- and polycarboxylic acids having 2 to 20 carbon atoms that are known from EP-A 0 100 129, for example sodium or potassium benzoate, the alkali metal phenoxides known from GB-A 1 391 066 and GB-A 1 386 399, for example sodium or potassium phenoxide, the alkali metal and alkaline earth metal oxides, hydroxides, carbonates, alkoxides and phenoxides known from GB 809 809, alkali metal salts of enolizable compounds and metal salts of weak aliphatic or cycloaliphatic carboxylic acids, for example sodium methoxide, sodium acetate, potassium acetate, sodium acetoacetate, lead 2-ethylhexanoate and lead naphthenate, the basic alkali metal compounds complexed with crown ethers or polyether alcohols that are known from EP-A 0 056 158 and EP-A 0 056 159, for example complexed sodium or potassium carboxylates, the pyrrolidinone-potassium salt known from EP-A 0 033 581, the mono- or polynuclear complex compound of titanium, zirconium and/or hafnium known from application EP 13196508.9, for example zirconium tetra-n-butoxide, zirconium tetra-2-ethylhexanoate and zirconium tetra-2-ethylhexoxide, and tin compounds of the type described in European Polymer Journal, vol. 16, 147-148 (1979), for example dibutyltin dichloride, diphenyltin dichloride, triphenylstannanol, tributyltin acetate, tributyltin oxide, tin octoate, dibutyl(dimethoxy)stannane and tributyltin imidazolate.

The isocyanate trimerization catalysts may be used in the process according to the invention either individually or else in the form of any desired mixtures with one another.

Isocyanate trimerization catalysts that may be highlighted are sodium and potassium salts of aliphatic carboxylic acids having 2 to 20 carbon atoms in combination with complexing agents such as crown ethers or polyethylene glycols or polypropylene glycols and also aliphatically substituted tin compounds or phosphines.

In the process according to the invention the isocyanate trimerization catalyst is generally employed in a concentration based on the amount of the employed curable component of 0.0005 to 5.0 wt %, preferably of 0.0010 to 2.0 wt % and particularly preferably of 0.0015 to 1.0 wt %.

The isocyanate trimerization catalysts finding use in the process according to the invention generally have sufficient solubility in the free-radically crosslinkable resin in the amounts that are required for initiation of the trimerization reaction. The addition of the isocyanate trimerization catalyst is therefore preferably effected in the absence of solvent.

In a further preferred embodiment the free-radical starter is selected from the group: α-hydroxyphenylketone, benzyldimethylketal and/or 2,4,6-trimethylbenzoyldiphenylphosphine oxide, bis(4-methoxybenzoyl)diethylgermanium (Ivocerin®)
and/or
the isocyanurate trimerization catalyst is selected from: potassium acetate, potassium acetate in combination with a crown ether, potassium acetate in combination with a polyethylene glycol, potassium acetate in combination with a polypropylene glycol, tin octoate, sodium phenoxide, potassium hydroxide, trioctyl phosphine and/or tributyltin oxide.

In a further preferred embodiment the molar ratio of NCO groups to Zerewitinoff-active H atoms in the resin is ≥500 (preferably ≥1000, more preferably ≥2000). The molar ratio of NCO groups to Zerewitinoff-active H atoms is also known as the NCO index or coefficient. Suitable bearers of Zerewitinoff-active H atoms include in particular compounds having O—H, N—H or S—H bonds. A proportion of compounds having Zerewitinoff-active H atoms that is as small as possible has the result that more NCO groups are available for isocyanurate formation after step III).

Alternatively or in addition, this condition may be expressed by specifying that the resin contains compounds having Zerewitinoff-active H atoms in an amount of ≤20 weight % (preferably ≤10 weight %, more preferably ≤5 weight %), based on the mass of the resin.

In a further preferred embodiment the curable component has a number-average molecular weight $M_n$ of ≥200 g/mol to ≤5000 g/mol. This molecular weight is preferably ≥300 g/mol to ≤4000 g/mol, more preferably ≥400 g/mol to ≤3000 g/mol.

In a further preferred embodiment in step IV) the treating of the precursor obtained after step III) under conditions sufficient to at least partially trimerize to isocyanurate groups NCO groups present in the free-radically crosslinked resin of the obtained precursor comprises a heating of the body to a temperature of ≥60° C. This temperature is preferably ≥80° C. to ≤250° C., more preferably ≥90° C. to ≤190° C. The chosen temperature or the chosen temperature range in step IV) may be maintained for example for ≥5 minutes to ≤48 hours, preferably ≥15 minutes to ≤24 hours and more preferably ≥1 hour to ≤12 hours.

In a further preferred embodiment the surface of the precursor obtained after step III) and/or of the object obtained after step IV) is contacted with a compound comprising Zerewitinoff-active H atoms, wherein water occurring as natural atmospheric humidity in the atmosphere surrounding the precursor and/or the object is excluded. In a reaction of still free NCO groups with these compounds a functionalization of the surfaces can be achieved. The compound comprising Zerewitinoff-active H atoms may be contacted with the surface of the precursor by immersion, spray application or spreading, for example. A further possibility is contacting via the gas phase, for example by means of ammonia or water vapor. A catalyst may optionally accelerate the reaction.

Examples of compounds suitable as the functionalization reagent are alcohols, amines, acids and derivatives thereof, epoxides and in particular polyols, for example sugars, polyacrylate polyols, polyester polyols, polyether polyols, polyvinyl alcohols, polycarbonate polyols, polyether carbonate polyols and polyester carbonate polyols, long-chain aliphatic alcohols, fluorinated or chlorinated alcohols. Further examples are polyacrylic acid, polyamides, polysiloxanes, polyacrylamides, polyvinylpyrrolidones, polyvinyl butyrate, polyketones, polyether ketones, polyacetals and polyamines. Amines may also be used for specific formation of ureas.

It is preferable to employ a long-chain alkyl alcohol, a long-chain (secondary) alkyl amine, a fatty acid, an epoxidized fatty acid ester, a (per)fluorinated long-chain alcohol or mixtures thereof. "Long-chain" is to be understood here as meaning from 6 carbon atoms, preferably from 8 carbon atoms, more preferably from 10 carbon atoms in the longest chain of the compound. The production of modified polyisocyanates is known in principle and described in EP-A 0 206 059 and EP-A 0 540 985 for example. It is effected preferably at temperatures of 40° C. to 180° C.

In a further preferred embodiment the process has the following additional features:
the carrier is arranged inside a container and is vertically lowerable in the direction of the gravitational force,
the container contains the free-radically crosslinkable resin in an amount sufficient to cover at least the carrier and crosslinked resin deposited atop the carrier,
before each step II) the carrier is lowered by a predetermined distance so that above the uppermost ply of the construction material viewed in the vertical direction a layer of the free-radically crosslinkable resin is formed and
in step II) an energy beam exposes and/or irradiates the selected region of the layer of the free-radically crosslinkable resin corresponding to the respectively selected cross section of the precursor.

Accordingly, this embodiment covers the additive manufacturing process of stereolithography (SLA). The carrier may for example be lowered by a predetermined distance of ≥1 μm to ≤2000 μm in each case.

In a further preferred embodiment the process has the following additional features:
the carrier is arranged inside a container and is vertically raisable counter to the direction of the gravitational force, the container provides the free-radically crosslinkable resin, before each step II) the carrier is raised by a predetermined distance so that below the lowermost ply of the construction material viewed in the vertical direction a layer of the free-radically crosslinkable resin is formed and in step II) a plurality of energy beams simultaneously expose and/or irradiate the selected region of the layer of the free-radically crosslinkable resin corresponding to the respectively selected cross section of the precursor.

Accordingly, this embodiment covers the additive manufacturing process of DLP technology when the plurality of energy beams generate the image to be provided by exposure and/or irradiation via an array of individually controllable micromirrors. The carrier may for example be raised by a predetermined distance of ≥1 µm to ≤2000 µm in each case.

In a further preferred embodiment the process has the following additional features:

in step II) the free-radically crosslinkable resin is applied from a printing head corresponding to the respectively selected cross section of the precursor and is subsequently exposed and/or irradiated.

Accordingly, this embodiment covers the additive manufacturing process of the inkjet method: the crosslinkable resin, optionally separately from the catalysts according to the invention, is applied selectively via one or more printing heads and the subsequent curing by irradiation and/or exposure may be nonselective, for example via a UV lamp. The one or more printing heads for application of the resin may be (modified) printing heads for inkjet printing processes. The carrier may be configured to be movable away from the printing head or the printing head may be configured to be movable away from the carrier. The increments of the spacing movements between the carrier and the printing head may be in a range from ≥1 µm to ≤2000 µm for example.

In this embodiment in particular through a small number of repetitions of step II) a very thin precursor may be constructed. This precursor may also be constructed on a substrate as the carrier which fulfills a function in the later use of the produced object. It is then justified to refer to application of a surface atop the carrier or the substrate. The substrate may be an interior or exterior part of a vehicle for example. The process according to the invention according to this embodiment may then also be regarded as a painting process.

The invention likewise relates to the use of a free-radically crosslinkable resin having a viscosity (23° C., DIN EN ISO 2884-1) of ≥5 mPas to ≤100000 mPas in an additive manufacturing process, wherein the resin comprises a curable compound having isocyanurate groups, NCO groups and olefinic C=C double bonds, wherein the molar ratio of NCO groups to olefinic C=C double bonds is in a range from ≥1:5 to ≤5:1 (preferably ≥1:4 to ≤4:1, more preferably ≥1:3 to ≤3:1), the molar ratio of NCO groups to isocyanurate groups is in a range from ≤100:1 to ≥1:2 (preferably ≤70:1 to ≥1:1, more preferably ≤50:1 to ≥2:1) and the molar ratio of olefinic C=C double bonds to isocyanurate groups is in a range from ≤100:1 to ≥1:5 (preferably ≤70:1 to ≥1:3, more preferably ≤50:1 to ≥1:2).

In a preferred embodiment of the use the resin further comprises a free-radical starter and/or an isocyanate trimerization catalyst. It is preferable when the free-radical starter is selected from the group: α-hydroxyphenylketone, benzyldimethylketal and/or 2,4,6-trimethylbenzoyldiphenylphosphine oxide, bis(4-methoxybenzoyl)diethylgermanium, and/or the isocyanurate trimerization catalyst is selected from: potassium acetate, potassium acetate in combination with a crown ether, potassium acetate in combination with a polyethylene glycol, potassium acetate in combination with a polypropylene glycol, tin octoate, sodium phenoxide, potassium hydroxide, trioctyl phosphine and/or tributyltin oxide.

In terms of the curable compound the same considerations and preferred embodiments apply for the use according to the invention as previously with regard to the process according to the invention. To avoid unnecessary repetition they are not recited again. It is merely noted that in a further preferred embodiment the olefinic double bonds are present at least partially in the form of (meth)acrylate groups in the curable compound and that in a further preferred embodiment the curable compound is obtainable from the reaction of an NCO-terminated polyisocyanurate with a molar deficiency, based on the free NCO groups, of a hydroxyalkyl (meth)acrylate.

In a further preferred embodiment of the use the additive manufacturing process comprises the exposure and/or irradiation of a previously selected region of the free-radically crosslinkable resin. The additive manufacturing process may be a stereolithography process or a DLP (digital light processing) process, for example. "Exposure" is to be understood in the present context as meaning the action of light in the range between near-IR and near-UV light (wavelengths of 1400 nm to 315 nm). The remaining shorter wavelength ranges are covered by the term "irradiation", for example far UV light, x-ray radiation, gamma radiation and also electron radiation.

The invention further provides a polymer obtainable by the crosslinking of a resin having a viscosity (23° C., DIN EN ISO 2884-1) of ≥5 mPas to ≤100000 mPas, wherein the resin comprises a curable component which comprises NCO groups and olefinic C=C double bonds, wherein the molar ratio of NCO groups to olefinic C=C double bonds is in a range from ≥1:5 to ≤5:1 (preferably ≥1:4 to ≤4:1, more preferably ≥1:3 to ≤3:1).

It is preferable when the polymer is a polymer obtainable by the crosslinking of a resin having a viscosity (23° C., DIN EN ISO 2884-1) of ≥5 mPas to ≤100000 mPas, wherein the resin comprises a curable component which comprises isocyanurate, NCO groups and olefinic C=C double bonds, wherein the molar ratio of NCO groups to olefinic C=C double bonds is in a range from ≥1:5 to ≤5:1 (preferably ≥1:4 to ≤4:1, more preferably ≥1:3 to ≤3:1), the molar ratio of NCO groups to isocyanurate groups is in a range from ≤100:1 to ≥1:2 (preferably ≤70:1 to ≥1:1, more preferably ≤50:1 to ≥2:1) and the molar ratio of olefinic C=C double bonds to isocyanurate groups is in a range from ≤100:1 to ≥1:5 (preferably ≤70:1 to ≥1:3, more preferably ≤50:1 to ≥1:2).

The crosslinking may in particular be effected via a two-stage process composed of free-radical crosslinking of the C=C double bonds followed by trimerization (including trimerization side reactions) of the NCO groups to afford isocyanurate groups.

In terms of the curable compound the same considerations and preferred embodiments apply for the use according to the invention as previously with regard to the process according to the invention. To avoid unnecessary repetition they are not recited again. It is merely noted that in a preferred embodiment the olefinic double bonds are present at least partially in the form of (meth)acrylate groups in the curable compound and that in a further preferred embodiment the curable compound is obtainable from the reaction of an NCO-terminated polyisocyanurate with a molar deficiency, based on the free NCO groups, of a hydroxyalkyl (meth)acrylate.

EXAMPLES

The invention is more particularly elucidated with reference to the examples which follow but without any intention to limit the invention thereto.

The formulations of free-radically crosslinkable resins reported in the table were produced. The data in the table relate to parts by weight unless otherwise stated.

|  | 1 | 2 |
|---|---|---|
| Isocyanate 1 | 56 | 70 |
| Isocyanate 2 | 14 | — |
| Acrylate | 30 | 30 |
| TPO | 0.8 wt % of the acrylate | 0.8 wt % of the acrylate |
| BBOT | 0.08 wt % of the acrylate | 0.08 wt % of the acrylate |
| KOAc catalyst | 1.5 wt % of isocyanates 1 and 2 | 1.5 wt % of isocyanate 1 |

Isocyanate 1: reaction product of the 1,6-HDI trimer with hydroxyethyl acrylate and the following idealized structure:

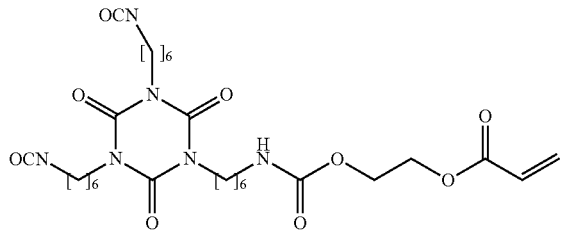

Isocyanate 2: NCO-terminated, polyether-modified HDI prepolymer (Desmodur N3100 Covestro Deutschland AG)

Acrylate: 1,6-hexanediol diacrylate (analytical quality obtained from Sigma-Aldrich)

TPO: diphenyl(2,4,6-trimethylbenzoyl)phosphine oxide; photoinitiator (obtained from Sigma-Aldrich)

BBOT: 2,2'-(2,5-thiophenediyl)bis(5-(1,1-dimethylethyl))benzoxazole; UV blocker (obtained from Sigma-Aldrich)

KOAc catalyst: potassium acetate+18-crown-6 crown ether in diethylene glycol (components obtained from Sigma-Aldrich and mixed in the ratio: 0.148 g of potassium acetate+0.485 g of 18-crown-6 ether+3.115 g of diethylene glycol.

The resin formulation Autodesk Standard Clear Prototyping Resin PR48 was chosen for a comparative example. This contains about 40 weight % of the aliphatic urethane acrylate EBECRYL 8210, about 40 weight % of the ethoxylated pentaerythritol tetraacrylate SARTOMER SR 494, TPO as a photoinitiator, about 20 weight % of the monofunctional urethane acrylate Rahn Genomer 1122 as a reactive diluent and MAYZO OB+(2,2'-(2,5-thiophenediyl)bis(5-tert-butylbenzoxazole)) as a UV blocker.

Formulations 1 and 2 and the formulation of the comparative example were used to produce standard S3 test bars for tensile tests on an Autodesk Ember DLP-based 3D printing apparatus. The wavelength for the exposure was 405 nm. The individual layers of the test bars were arranged parallel to the tensile direction. The layer thickness was 50 µm in each case. The exposure time was 5 s/layer.

The precursors produced from formulations 1 and 2 were subsequently heated for 30 minutes at 130° C. in a forced-air drying cabinet.

The thus obtained test bars had the properties reported in the table below.

|  | comparative | 1 | 2 |
|---|---|---|---|
| Modulus of elasticity [GPa], DIN 53504 | 1 | 1.3 | 1.2 |
| Tensile strength [MPa], DIN 53504 | 34 | 48 | 48 |
| Elongation at break [%], DIN 53504 | 5.4 | 4.4 | 5.1 |
| Glass transition temperature [° C.], DSC, 20 K/min | 15 | 70 | 70 |

Various aspects of the subject matter described herein are set out in the following numbered clauses:

1. Process for producing an object from a precursor, comprising the steps of:
I) depositing a free-radically crosslinked resin atop a carrier to obtain a ply of a construction material joined to the carrier which corresponds to a first selected cross section of the precursor;
II) depositing a free-radically crosslinked resin atop a previously applied ply of the construction material to obtain a further ply of the construction material which corresponds to a further selected cross section of the precursor and which is joined to the previously applied ply;
III) repeating step II) until the precursor is formed;
wherein the depositing of a free-radically crosslinked resin at least in step II) is effected by exposure and/or irradiation of a selected region of a free-radically crosslinkable resin corresponding to the respectively selected cross section of the precursor and
wherein the free-radically crosslinkable resin has a viscosity (23° C., DIN EN ISO 2884-1) of ≥5 mPas to ≤100000 mPas, characterized in that the free-radically crosslinkable resin has a curable component in which NCO groups and olefinic C═C double bonds are present,
wherein in the curable compound the molar ratio of NCO groups to olefinic C═C double bonds is in a range from ≥1:5 to ≤5:1,
and in that, after step III), step IV) is further performed:
IV) treating the precursor obtained after step III) under conditions sufficient to at least partially trimerize to isocyanurate groups NCO groups present in the free-radically crosslinked resin of the obtained precursor to obtain the object.

2. Process according to clause 1, characterized in that isocyanurate groups are further present in the curable component, wherein the molar ratio of NCO groups to isocyanurate groups is in a range from ≤100:1 to ≥1:2 and in the curable component the molar ratio of olefinic C═C double bonds to isocyanurate groups is in a range from ≤100:1 to ≥1:5.

3. Process according to clauses 1 or 2, characterized in that the curable component comprises a curable compound which comprises NCO groups and olefinic C═C double bonds, wherein in the curable compound the molar ratio of NCO groups to olefinic C═C double bonds is in a range from ≥1:5 to ≤5:1.

4. Process according to clause 3, characterized in that the curable component comprises a curable compound comprising isocyanurate groups, NCO groups and olefinic C=C double bonds, wherein
in the curable compound the molar ratio of NCO groups to olefinic C=C double bonds is in a range from ≥1:5 to ≤5:1,
in the curable compound the molar ratio of NCO groups to isocyanurate groups is in a range from ≤100:1 to ≥1:2, and
in the curable compound the molar ratio of olefinic C=C double bonds to isocyanurate groups is in a range from ≤100:1 to ≥1:5.

5. Process according to any of clauses 1 to 4, characterized in that the free-radically crosslinkable resin further comprises a free-radical starter and/or an isocyanate trimerization catalyst.

6. Process according to clause 5, characterized in that at least one free-radical starter is selected from the group: α-hydroxyphenylketone, benzyldimethylketal, 2,4,6-trimethylbenzoyldiphenylphosphine oxide, bis(4-methoxybenzoyl)diethylgermanium and any combination of at least two thereof
and/or
the isocyanurate trimerization catalyst is selected from: potassium acetate, potassium acetate in combination with a crown ether, potassium acetate in combination with a polyethylene glycol, potassium acetate in combination with a polypropylene glycol, tin octoate, sodium phenoxide, potassium hydroxide, trioctyl phosphine and/or tributyltin oxide.

7. Process according to any of clauses 1 to 6, characterized in that in the resin the molar ratio of NCO groups to Zerewitinoff-active H atoms is ≥500.

8. Process according to any of clauses 1 to 7, characterized in that the curable component has a number-average molecular weight $M_n$ of ≥200 g/mol to ≤5000 g/mol.

9. Process according to any of clauses 1 to 8, characterized in that in step IV) the treating of the precursor obtained after step III) under conditions sufficient to at least partially trimerize to isocyanurate groups NCO groups present in the free-radically crosslinked resin of the obtained precursor comprises a heating of the body to a temperature of ≥60° C.

10. Process according to any of clauses 1 to 9, characterized in that the surface of the precursor obtained after step III) and/or of the object obtained after step IV) is contacted with a compound comprising Zerewitinoff-active H atoms, wherein water occurring as natural atmospheric humidity in the atmosphere surrounding the precursor and/or the object is excluded.

11. Process according to any of clauses 1 to 10, characterized in that:
the carrier is arranged inside a container and is vertically lowerable in the direction of the gravitational force,
the container contains the free-radically crosslinkable resin in an amount sufficient to cover at least the carrier and crosslinked resin deposited atop the carrier,
before each step II) the carrier is lowered by a predetermined distance so that above the uppermost ply of the construction material viewed in the vertical direction a layer of the free-radically crosslinkable resin is formed and
in step II) an energy beam exposes and/or irradiates the selected region of the layer of the free-radically crosslinkable resin corresponding to the respectively selected cross section of the precursor.

12. Process according to any of clauses 1 to 10, characterized in that:
the carrier is arranged inside a container and is vertically raisable counter to the direction of the gravitational force,
the container provides the free-radically crosslinkable resin,
before each step II) the carrier is raised by a predetermined distance so that below the lowermost ply of the construction material viewed in the vertical direction a layer of the free-radically crosslinkable resin is formed and
in step II) a plurality of energy beams simultaneously expose and/or irradiate the selected region of the layer of the free-radically crosslinkable resin corresponding to the respectively selected cross section of the precursor.

13. Process according to any of clauses 1 to 10, characterized in that:
in step II) the free-radically crosslinkable resin is applied from one or more printing heads corresponding to the respectively selected cross section of the precursor and is subsequently exposed and/or irradiated.

14. Use of a free-radically crosslinkable resin having a viscosity (23° C., DIN EN ISO 2884-1) of ≥5 mPas to ≤100000 mPas in an additive manufacturing process, characterized in that
the resin has a curable compound which comprises isocyanurate groups, NCO groups and olefinic C=C double bonds,
wherein the molar ratio of NCO groups to olefinic C=C double bonds is in a range from ≥1:5 to ≤5:1,
in the curable compound the molar ratio of NCO groups to isocyanurate groups is in a range from ≤100:1 to ≥1:2, and
in the curable compound the molar ratio of olefinic C=C double bonds to isocyanurate groups is in a range from ≤100:1 to ≥1:5.

15. Polymer obtainable by crosslinking of a resin having a viscosity (23° C., DIN EN ISO 2884-1) of ≥5 mPas to ≤100000 mPas,
characterized in that
the resin comprises a curable component comprising NCO groups and olefinic C=C double bonds, wherein the molar ratio of NCO groups to olefinic C=C double bonds is in a range from ≥1:5 to ≤5:1.

The invention claimed is:

1. A process for producing an object from a precursor, comprising the steps of:
I) depositing a free-radically crosslinked resin atop a carrier to obtain a ply of a construction material joined to the carrier which corresponds to a first selected cross section of the precursor; wherein the carrier is arranged inside a container and is vertically raisable counter to the direction of the gravitational force, and the container provides the free-radically crosslinkable resin,
II) depositing a free-radically crosslinked resin atop a previously applied ply of the construction material to obtain a further ply of the construction material which corresponds to a further selected cross section of the precursor and which is joined to the previously applied ply;
wherein before each step II) the carrier is raised by a predetermined distance so that below the lowermost ply of the construction material viewed in the vertical direction a layer of the free-radically crosslinkable resin is formed, III) repeating step II) until the precursor is formed;
wherein the depositing of a free-radically crosslinked resin at least in step II) is effected by exposure and/or irradiation of a selected region of a free-radically crosslinkable resin corresponding to the respectively selected cross section of the precursor and
wherein the free-radically crosslinkable resin has a viscosity (23° C., DIN EN ISO 2884-1) of ≥5 mPas to ≤100000 mPas,
wherein
the free-radically crosslinkable resin has a curable component in which NCO groups and olefinic C=C double bonds are present,
wherein in the curable compound the molar ratio of NCO groups to olefinic C=C double bonds is in a range from ≥1:5 to ≤5:1,
and wherein, after step III), step IV) is further performed:
IV) treating the precursor obtained after step III) under conditions sufficient to at least partially trimerize to isocyanurate groups NCO groups present in the free-radically crosslinked resin of the obtained precursor to obtain the object.

2. The process according to claim 1, wherein isocyanurate groups are further present in the curable component, wherein the molar ratio of NCO groups to isocyanurate groups is in a range from ≤100:1 to ≥1:2 and in the curable component the molar ratio of olefinic C=C double bonds to isocyanurate groups is in a range from ≤100:1 to ≥1:5.

3. The process according to claim 1 wherein the curable component comprises a curable compound comprising isocyanurate groups, NCO groups and olefinic C=C double bonds, wherein
in the curable compound the molar ratio of NCO groups to isocyanurate groups is in a range from ≤100:1 to ≥1:2, and
in the curable compound the molar ratio of olefinic C=C double bonds to isocyanurate groups is in a range from ≤100:1 to ≥1:5.

4. The process according to claim 1 wherein the free-radically crosslinkable resin further comprises a free-radical starter and/or an isocyanate trimerization catalyst.

5. The process according to claim 1 wherein at least one free-radical starter is selected from the group: α-hydroxyphenylketone, benzyldimethylketal, 2,4,6-trimethylbenzoyldiphenylphosphine oxide, bis(4-methoxybenzoyl)diethylgermanium and any combination of at least two thereof and/or
the isocyanurate trimerization catalyst is selected from:
potassium acetate, potassium acetate in combination with a crown ether, potassium acetate in combination with a polyethylene glycol, potassium acetate in combination with a polypropylene glycol, tin octoate, sodium phenoxide, potassium hydroxide, trioctyl phosphine and/or tributyltin oxide.

6. The process according to claim 1 wherein in the resin the molar ratio of NCO groups to Zerewitinoff-active H atoms is ≥500.

7. The process according to claim 1 wherein the curable component has a number-average molecular weight $M_n$ of ≥200 g/mol to ≤5000 g/mol.

8. The process according to claim 1 wherein in step IV) the treating of the precursor obtained after step III) under conditions sufficient to at least partially trimerize to isocyanurate groups NCO groups present in the free-radically crosslinked resin of the obtained precursor comprises a heating of the body to a temperature of ≥60° C.

9. The process according to claim 1 wherein the surface of the precursor obtained after step III) and/or of the object obtained after step IV) is contacted with a compound comprising Zerewitinoff-active H atoms, wherein water occurring as natural atmospheric humidity in the atmosphere surrounding the precursor and/or the object is excluded.

10. The process according to claim 1 wherein:
the carrier is arranged inside a container and is vertically lowerable in the direction of the gravitational force,
the container contains the free-radically crosslinkable resin in an amount sufficient to cover at least the carrier and crosslinked resin deposited atop the carrier,
before each step II) the carrier is lowered by a predetermined distance so that above the uppermost ply of the construction material viewed in the vertical direction a layer of the free-radically crosslinkable resin is formed and
in step II) an energy beam exposes and/or irradiates the selected region of the layer of the free-radically crosslinkable resin corresponding to the respectively selected cross section of the precursor.

11. The process according to claim 1 wherein:
in step II) a plurality of energy beams simultaneously expose and/or irradiate the selected region of the layer of the free-radically crosslinkable resin corresponding to the respectively selected cross section of the precursor.

12. The process according to claim 1 wherein:
in step II) the free-radically crosslinkable resin is applied from one or more printing heads corresponding to the respectively selected cross section of the precursor and is subsequently exposed and/or irradiated.

* * * * *